UNITED STATES PATENT OFFICE.

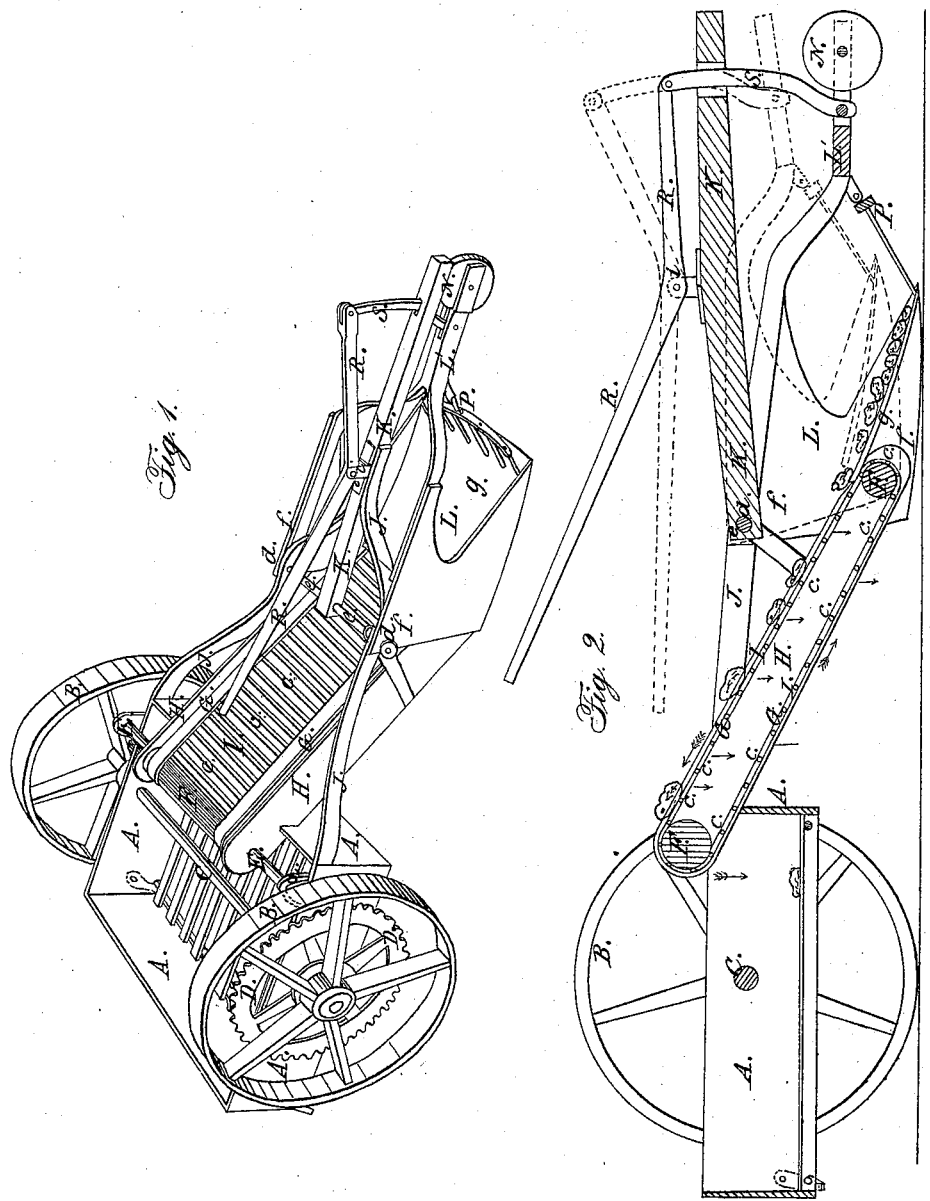

GEORGE S. TIFFANY, OF PALMYRA, MICHIGAN.

IMPROVEMENT IN MACHINES FOR DIGGING POTATOES.

Specification forming part of Letters Patent No. 24,505, dated June 21, 1859.

*To all whom it may concern:*

Be it known that I, GEORGE S. TIFFANY, of Palmyra, in the county of Lenawee and State of Michigan, have invented certain new and useful Improvements in Potato-Diggers; and I do hereby declare that the following is a full, clear, and exact description of the same, reference being had to the accompanying drawings, and to the letters of reference marked thereon.

Figure 1 exhibits a perspective view of the machine with the several parts arranged for operation. Fig. 2 shows a vertical section of the machine, taken longitudinally through the center, and shows the parts in two positions.

The nature of my invention consists in arranging in front of a plow for digging potatoes an inclined fork, so that the points of the teeth of said fork will rest upon the point of the shovel or plow and allow the earth and potatoes to pass freely on the plow, but effectually prevent the potatoes from falling off. At the same time it is so arranged with respect to the machine that it is always in position to act—described as follows:

The cart-body A is supported upon two wheels, B B, the shaft C of which passes through the sides of the body and near its top. The bottom of the cart is made up of slats hinged at the front end and latched at the other, so that it can be dropped down in depositing the load. This arrangement of bottom greatly facilitates the unloading of the cart and also clears off any earth which may adhere to the potatoes after they have passed the riddling process.

A spur-wheel, D, is fixed to the shaft C between the wheel B and side of the cart, and meshes into the teeth of a pinion, $a$, fixed to one end of a shaft, E, which has its bearings in each side of the cart-body A. Upon this shaft is a roller, F, over which passes two endless belts, G, and from thence are carried down and passed over a roller, F', which is pivoted to the extreme ends of two inclined sides, H, which serve the double purpose of bearings for the roller F' and guard-plates to prevent the potatoes from falling from the riddle I, which is formed of the belts G and lateral slats $cc$, placed sufficiently near each other to prevent the smallest potatoes from falling through as they are being sifted and conveyed to the cart.

Two bent bars, J J, are connected to the sides of the cart-body, and proceed therefrom to the draft-beam K. These bars serve as a support for the plow or shovel L, to which it is pivoted at the points $d\ d$ by a rod, $e$, which passes through the two sides $ff$ of the plow and through the rear end of the beam K. The sides $ff$ drag upon the ground; but the bottom $g$, the front edge of which may be sharp, is raised from the point and lies over the roller F', so that the potatoes and the earth intermixed with them will be conveyed immediately upon the riddle as they are forced from the bottom of the plow.

L' is a bifurcated wheel-beam the forks of which are attached to the sides $ff$ of the plow and proceed therefrom a suitable distance from the point of the plow, where is pivoted a wheel, N, which is made to roll over the hills in the operation of digging.

P is an inclined fork the head of which is pivoted to the wheel-beam L', so that the teeth will rest upon the point of the plow. The object of this fork is to prevent the potatoes falling off the front of the plow after they have been dug up. This fork raises and allows them to pass freely under it, but effectually prevents them from returning.

R is a bent lever having its fulcrum at $i$, the handle of which projects over the riddle a suitable distance. The opposite end of this lever is pivoted to a curved rod, S, which passes through a slot in the front end of the draft-beam K, and connects with the wheel-beam L' immediately in rear of the wheel. By raising or depressing the lever the point of the plow is thrown out or in the ground. At the same time also the wheel N is raised or lowered.

The operation of this machine in digging potatoes is as follows: When the wheel N descends the hill the plow enters near the opposite side, and when the wheel ascends the next hill it rises the plow out of the ground. The fork P raises, and as soon as the hill is passed this fork descends upon the point of the plow, and prevents any of the potatoes from falling back while passing to the next hill or turning the machine around. The potatoes are then carried to the riddle, where they are separated from the dirt, and from thence deposited into the cart, as above described.

This machine is not only useful in digging potatoes, but turnips or other similar crops can be harvested with the same facility and ease. In adapting it to other crops than potatoes the wheel N is set so that the plow can be fixed to the required depth in the ground.

What I claim as new, and desire to secure by Letters Patent, is—

The hinged fork P, in combination with the plow L', when the same are arranged and operate as and for the purposes herein set forth.

GEORGE S. TIFFANY.

Witnesses:
 NOAH LEE,
 I. L. G. WARD.